(12) United States Patent
Hiraishi

(10) Patent No.: US 7,432,999 B2
(45) Date of Patent: Oct. 7, 2008

(54) LIQUID CRYSTAL DISPLAY, SURFACE LIGHT SOURCE DEVICE AND LIGHT CONTROL SHEET

(75) Inventor: Fuminori Hiraishi, Urawa (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 09/726,329

(22) Filed: Dec. 1, 2000

(65) Prior Publication Data

US 2001/0003472 A1 Jun. 14, 2001

(30) Foreign Application Priority Data

Dec. 9, 1999 (JP) ............................. 1999-350366

(51) Int. Cl.
*G02F 1/1335* (2006.01)
(52) U.S. Cl. .............................. 349/62; 349/65; 362/31
(58) Field of Classification Search ............ 349/61–66; 362/26, 27, 29, 30, 31–32
See application file for complete search history.

(56) References Cited

U.S. PATENT DOCUMENTS

| | | | |
|---|---|---|---|
| 5,587,816 A * | 12/1996 | Gunjima et al. ................ | 349/62 |
| 5,712,694 A * | 1/1998 | Taira et al. ..................... | 349/9 |
| 5,751,388 A | 5/1998 | Larson | |
| 5,835,175 A | 11/1998 | Itoh et al. | |
| 5,948,487 A | 9/1999 | Sahouani et al. | |
| 2001/0003472 A1 * | 6/2001 | Hiraishi ....................... | 349/65 |

FOREIGN PATENT DOCUMENTS

| | | |
|---|---|---|
| JP | 11-144515 | 5/1999 |
| KR | 1999-029518 | 4/1999 |
| KR | 1999-0063964 | 7/1999 |
| WO | 98/05984 | 2/1998 |

* cited by examiner

*Primary Examiner*—Dung T. Nguyen
(74) *Attorney, Agent, or Firm*—Staas & Halsey LLP

(57) ABSTRACT

A fluorescent lamp 6 emits illumination light (primary light), which is deflected by means of a light guide plate 4 to be converted into a light flux having an enlarged cross section. A liquid crystal display panel 3 is supplied with the light flux via a prism sheet (light control sheet) 12. The prism sheet 12 or an alternative light control sheet to be employed is capable of rotating polarization involved by the light toward a direction of light transmission axis of a polarization plate 14. An effective light input to the liquid crystal display panel 3 is achieved by light transmission through the polarization plate 14 at a high transmission rate. The liquid crystal display panel 3 controls polarization state of the inputted light and, according to the state, causes the light to pass through another polarization plate (analyser) 15. Emission occurs, under intensity control depending on positions, via the polarization plate (analyzer) 15, to provide an image. Polarization rotation function for modifying the emission of the light guide plate 4 can be obtained through manufacturing of a mother material of the prism sheet 12 by means of one-axle drawing process or two-axle drawing process. Prism cuts may be formed on a back face 8 or emission face 11 of the light guide plate 4. A polarization-rotating sheet may be alternatively interposed between a prism sheet provided with no polarization-rotating ability and the polarization plate 14.

6 Claims, 12 Drawing Sheets

| PRISM SHEET | BRIGHTNESS (cd/m$^2$) | ESTIMATION |
|---|---|---|
| 12a | 216 | ○ |
| 12b | 205.8 | ○ |
| 12c | 207.7 | ○ |
| 12d | 202 | △ |
| 12e | 197.9 | △ |
| 12f | 192.9 | × |
| 12g | 189.8 | × |
| 12h | 190.2 | × |
| 12i | 190.1 | × |

LIQUID CRYSTAL DISPLAY, SURFACE LIGHT SOURCE DEVICE AND LIGHT CONTROL SHEET

BACKGROUND

1. Field of the Invention

The present invention relates to a surface light source device, a liquid crystal display employing the surface light source device and a light control sheet which is advantageously applied to them. The present invention is applied, for example, to displays for personal computer or navigation system.

2. Related Art

Referring to FIG. 16, shown is an outlined arrangement of a liquid crystal display 29 which is employed, for example, in a portable personal computer. The liquid crystal display 29 comprises a liquid crystal display panel 32 and a surface light source device 33 disposed on a lower side (i.e. back side) of the panel. The illustrated surface light source device 33 is provided with a fluorescent lamp 36, light guide plate 34 and prism sheet (light control sheet) 35.

According to a well-known operation, the fluorescent lamp 36 emits illumination light (primary light), which is deflected by the light guide 34 to be converted into a flux having an enlarged cross section. The flux is supplied to the liquid crystal display panel 32 via the prism sheet (light control sheet) 35.

The liquid crystal display panel 32 comprises a polarization plate 37 disposed on a light input side, another polarization plate (analyser) 40 disposed on a light output side and a liquid crystal display cell 38 interposed between them. Accordingly, the liquid crystal display cell 38 is supplied with the output illumination light of the surface light source device 33 via the polarization plate 37. As known well, the liquid crystal display cell 38 controls polarization state of the inputted light depending on position according to output signals of a drive circuit (not shown).

Then, output light of the liquid crystal display cell 38 transmits through the polarization plate (analyser) 40 depending on state of polarization. After all, light H intensity of which is controlled depending on position is emitted through the polarization plate (analyser) 40. Some of the light H is incident to eyes 41 of an operator of the personal computer, causing the operator to see an image.

The conventional liquid crystal display 29 is, however, subject to a problem that has been unrecognized. That is, screen brightness often varies depending on combination of the liquid crystal display panel 32 and the surface light source device 33 arranged for the device. It is noted that difference in screen brightness arises depending on neither performance of the surface light source device 33 itself nor that of liquid crystal display panel 32, but depending on congeniality between the device 33 and panel 22. Such phenomenon has been unknown and found newly.

Researches tells that the phenomenon occurs in relation to direction of transmission axis of the polarization plate 37 disposed on an input side of the liquid crystal display cell 38. In general, a polarization plate 37 is arranged in a liquid crystal display so that the transmission axis 42 is orientated as shown in either FIG. 17a or FIG. 17b. In FIGS. 17a and 17b, reference symbol E represents an extending direction of prismatic grooves 35a of a prism sheet 35 (cf. FIG. 16), the direction being parallel with that of the fluorescent lamp 36.

It has been found that a great difference in screen brightness arises between a case as shown in FIG. 17a (Case 1) and another case as shown in FIG. 17b (Case 2) under employment of the same prism sheet 35 in both cases.

Therefore, the problem seems to solved passively by means of excluding items (liquid crystal displays) having "bad congeniality" through brightness checking of every individual item, or by means of changing combination so that "good congeniality" is realized. Such ways leads, however, to a reduced efficiency of working. Thus, a positive means to solve the problem has been awaited.

OBJECT AND SUMMARY OF INVENTION

The present invention is proposed under the above-described background. An object of the present invention is to provide a surface light source device which is improved as to overcome the above-described problem. Another object of the present invention is to provide a liquid crystal display free from the above-described problem. Still another object of the present invention is to provide a light control sheet which is capable of contributing to solution of the problem in the devices.

First, the present invention is applied to a liquid crystal display comprising a liquid crystal display panel and a surface light source device for inputting light to the liquid crystal display panel. The liquid crystal display panel is provided with at least a liquid crystal cell and a polarization plate arranged at an input side of the liquid crystal cell, and the surface light source device is provided with at least a light guide plate, a primary light source to supply illumination light to the light guide plate and a light control sheet interposed between the light guide plate and the polarization plate.

According to a feature of the present invention, the light control sheet employed in the device is one that rotates a maximum-intensity-direction of polarization involved by light emitted from the light guide plate toward a direction of light transmission axis of the polarization plate.

The present invention is also applied to a surface light source device for inputting light to a liquid crystal display panel provided with at least a liquid crystal cell and a polarization plate arranged at an input side of the liquid crystal cell. The surface light source device comprises at least a light guide plate, a primary light source to supply illumination light to the light guide plate and a light control sheet interposed between the light guide plate and the polarization plate.

According to the feature of the present invention, the light control sheet employed in the device is one that rotates a maximum-intensity-direction of polarization involved by light emitted from the light guide plate toward a direction of light transmission axis of the polarization plate.

The present invention is further applied to a light control sheet arranged for inputting light to a liquid crystal display panel provided with at least a liquid crystal cell and a polarization plate which is arranged at an input side of the liquid crystal cell, the light control sheet being applied to a surface light source device provided with at least a light guide plate and a primary light source to supply illumination light to the light guide plate.

According to the feature of the present invention, the light control sheet has a function of rotating a maximum-intensity-direction of polarization of light emitted from the light guide plate toward a direction of light transmission axis of the polarization plate.

The above and the other features of the present invention will be understood with ease from the following detailed description with referring to the drawings attached. It should be noted that sizes of elements are partially exaggerated as required for the sake of easy understanding in the drawings.

EMBODIMENTS

(1) First Embodiment

Figure 1:
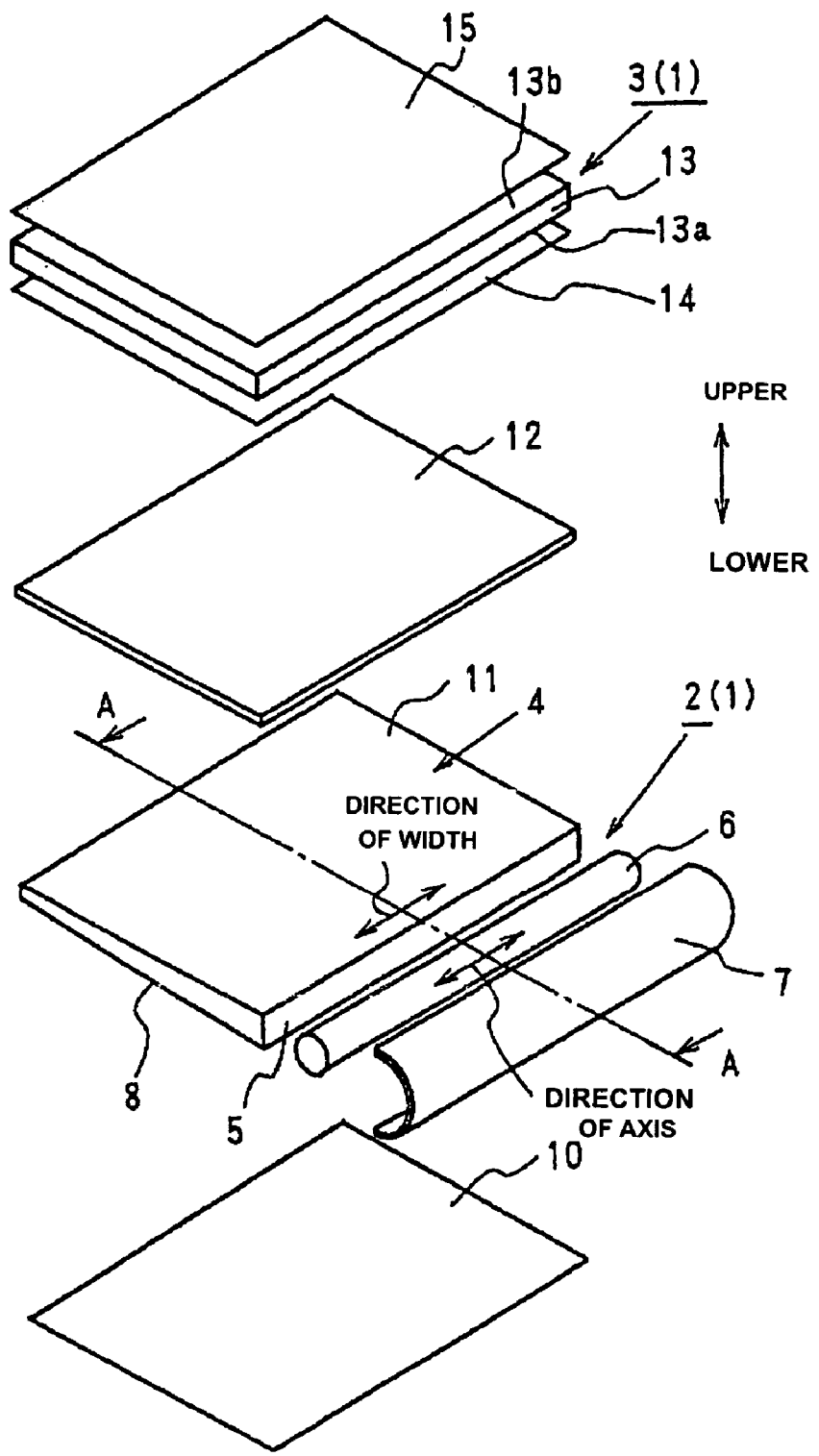
FIG. 1 is an exploded perspective view of a liquid crystal display in accordance with an embodiment of the present invention.
Figure 2:
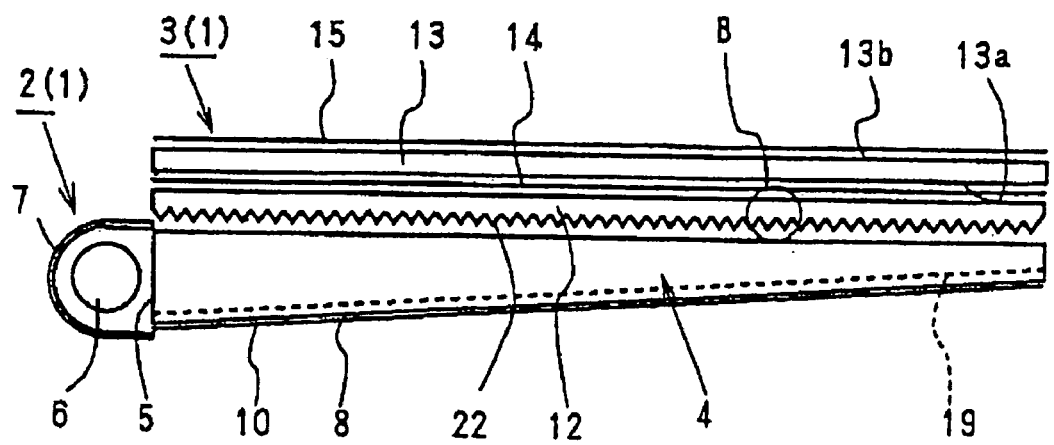
FIG. 2 is a cross section view along line A-A in FIG. 1.
Figure 3:
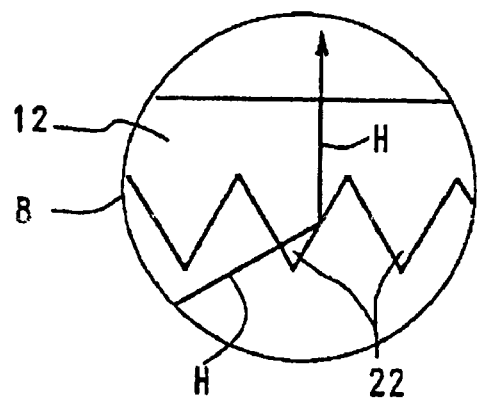
FIG. 3 is an enlarged view of a portion B in FIG. 2.

FIGS. 1 and 2 show a liquid crystal display in accordance with an embodiment of the present invention. The liquid crystal display 1 comprises a liquid crystal display panel 3 and a surface light source device 2 arranged for illuminating the panel. And the surface light source device 2 is provided with a light guide plate 4, rod-like fluorescent lamp 6, roughly-U-shaped lamp reflector 7, reflection sheet 10 and prism sheet 12.

The light guide plate 4 is rectangular and has a size roughly the same as that of the liquid crystal display panel 3. The rod-like fluorescent lamp 6 and roughly-U-shaped lamp reflector 7 compose a primary light source. The reflection sheet 10 is disposed along a back face 8 of the light guide plate 4. The prism sheet 12 functions as a light control sheet which controls and modifies direction of emission from an emission face 11 of the light guide plate 4.

Figures 13A, 13B:
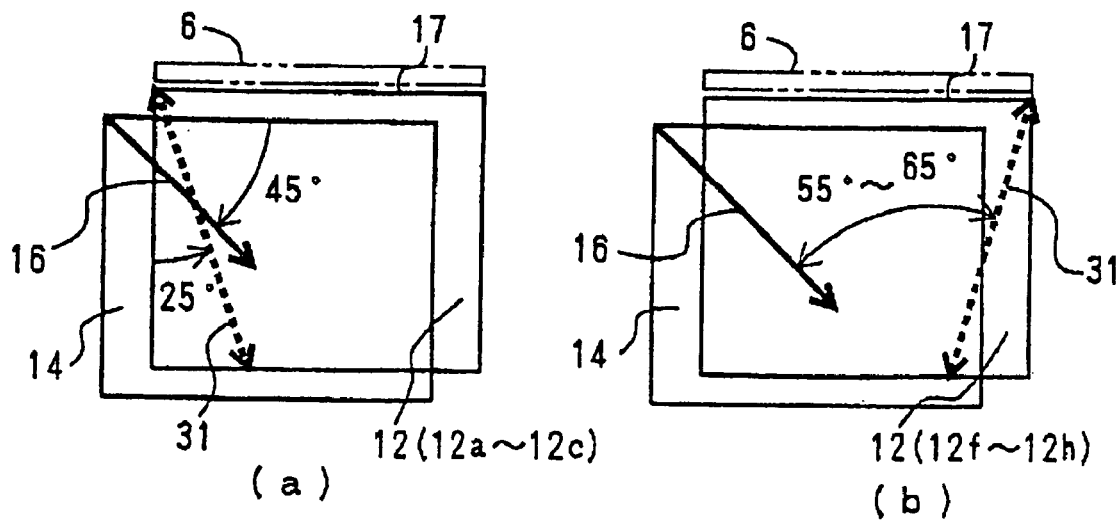
FIG. 13a is a diagram to illustrate orientations of the prism sheets 12a to 12c with respect to a polarization plate, respectively.
FIG. 13b is a diagram to illustrate orientations of the prism sheets 12f to 12h with respect to a polarization plate, respectively.

The liquid crystal display panel 3 comprises a liquid crystal cell 13, a polarization plate 14 disposed on a lower face (light input side) 13a of the cell and another polarization plate 15 disposed on an upper face (light output side) 13b of the cell. As illustrated in FIG. 13a or FIG. 13b, the polarization plate 14 is orientated so that a transmission axis 16 is inclined 45 degrees with respect to an end edge 17 shown on an upper portion in the illustration (i.e. on the side of the fluorescent lamp 16). It is noted that "liquid crystal display cell" is an element composed of an array substrate, CF-substrate and liquid crystal material enclosed between them.

The light guide plate 4 is made of a light-permeable resin (such as polymethyl methacrylate) within which light scattering material such as silicone-type resin powder is dispersed uniformly, being preferably provided with a wedge-like cross section. A great number of prismatic grooves 19 are formed repeatedly on the back face 8 of the light guide plate 4 in a direction approximately vertical to a longitudinal direction of the fluorescent lamp 6. Each groove has a cross section like a triangle.

To prepare the prism sheet (light control sheet) 12, the following manufacturing steps were performed. The steps are typical and generally employed.

Figure 4:
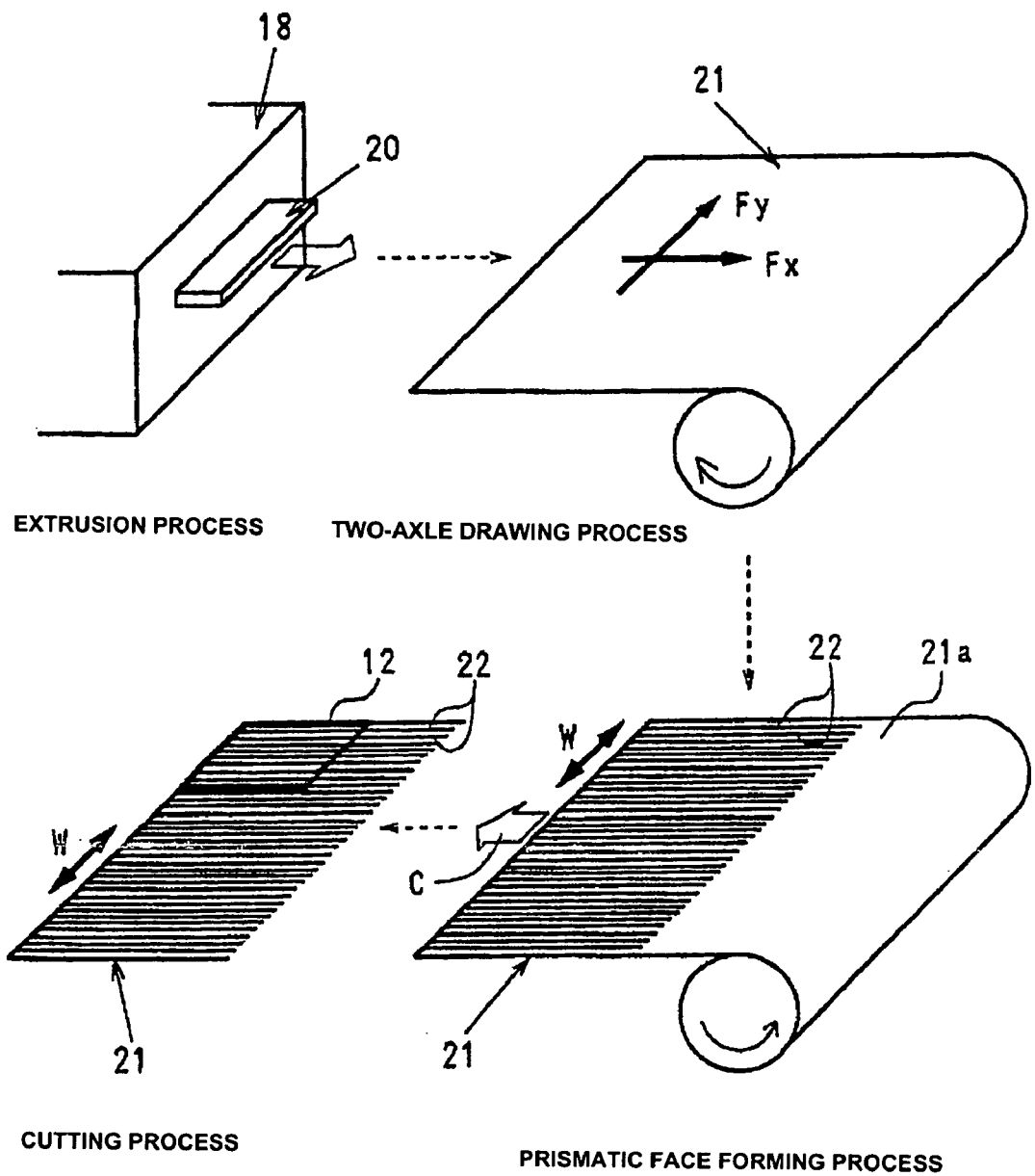
FIG. 4 is an illustration of processes for manufacturing of prism sheets.

1. Polyethylene terephthalate (PET) 20 is extruded from an extrusion machine 18 as shown in FIG. 4 (Step of extrusion).

2. Two-axle drawing step in which a sheet material having a predetermined width is formed by two-axle drawing of the extruded PET 20 and followed by rolling up.

3. Prismatic face forming step in which a prismatic face 22 made of ultraviolet-setting resin curing resin is formed continuously on any one face 21a of the sheet material 21 obtained in the two-axle drawing step.

4. Cutting step in which rectangular light control sheets are obtained by cutting the sheet material provided with the prismatic face 22 formed through the prismatic face forming step.

Cutting size is determined as to approximately the same as size of the emission face 11 of the light guide plate 4. The prismatic face 22 is formed in the prismatic face forming step illustrated in FIG. 4 so that prismatic configuration extends in a direction along the drawing direction (arrow C) of the sheet material 21. And a great number of prismatic grooves are formed in a predetermined pitch in a width-direction W of the sheet material 21 and in parallel to each other.

In the cutting step, cutting-out of each prism sheet 12 from the sheet material 21 is performed so that each prism sheet 12 has a prismatic face 22 provided with a prismatic configuration extending approximately in parallel with an incidence face of the light guide plate 4 (See FIGS. 2 and 4).

It is noted that Fx represents tension in X-axis direction and Fy represents tension in Y-axis direction.

As follows, description is given about mechanism how the foresaid problem arises in the prior arts and further about a method how to solve the problem with referring to FIGS. 5 through 12.

First, angular emission intensity distribution of the light guide plate was examined. It has been observed that a maximum-intensity-direction 23 is approximately perpendicular to the incidence face 5 and is inclined about 70 degrees to a normal 24 with respect to the emission face 11 as to be far from the fluorescent lamp 6.

Nevertheless this is merely an example, in general, there is no great difference between the above-observed maximum-intensity-direction and those observed in other light guide plates. In view of this, the above-observed maximum-intensity-direction is "typical".

Figure 5:
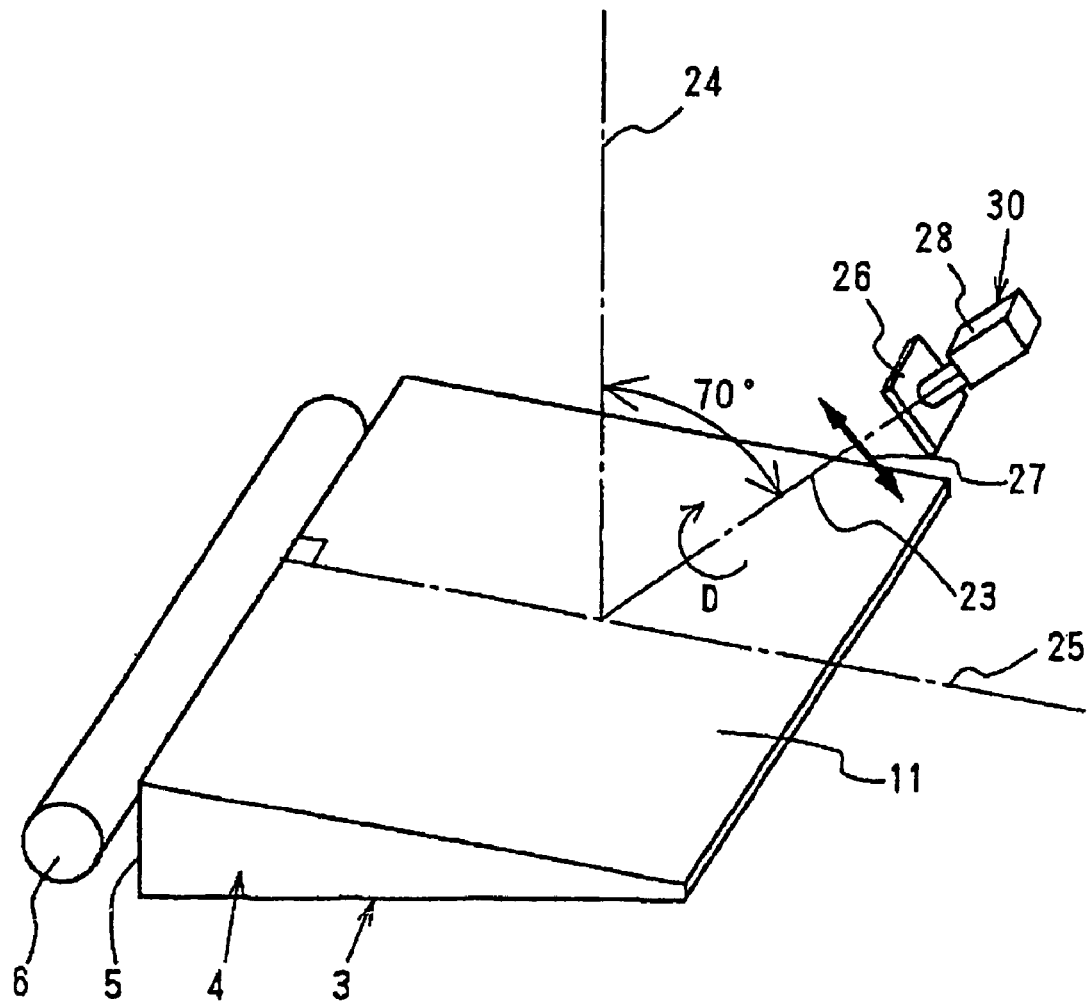
FIG. 5 is a diagram to illustrate a method for measuring polarization state of emission from a light guide plate.

Under such a situation, a light beam emitted in the maximum-intensity-direction 23 is recognized as a representative emission from the light guide plate 4 and is examined for polarization state. Measurement was carried out in an arrangement as shown in FIG. 5.

A photo-intensity measuring device 30 is composed of a polarization plate for measurement 26 having a light transmission axis 27 and a photometer 28 for detecting light which transmits through the polarization plate 26. Intensity of light was measured at many rotation positions around the direction 23. Results are shown in a graph of FIG. 6. In the graph, an angular scale extending peripherally indicates orientational positions of the light transmission axis 27 (dual-arrow in FIG. 5).

A radial scale indicates relative intensity of light detected by the photometer 28. The full scale is 100. It is noted that such a graphic illustration format in FIG. 6 is also applied to FIGS. 10 to 12 and 14 in the same manner.

When a projection of the transmission axis 27 onto the emission face 11 is orientated in accordance with a direction 25 perpendicular to the incidence face 5, it corresponds to 0 degree or 180 degrees. In the illustrated case, FIG. 5 shows a state of 0 degree.

The polarization plate for measurement 26 was rotated clockwise (direction D) from 0 degree position and stepwise by 5 degrees, wherein a polarization component was measured at every rotation position.

Figure 6:
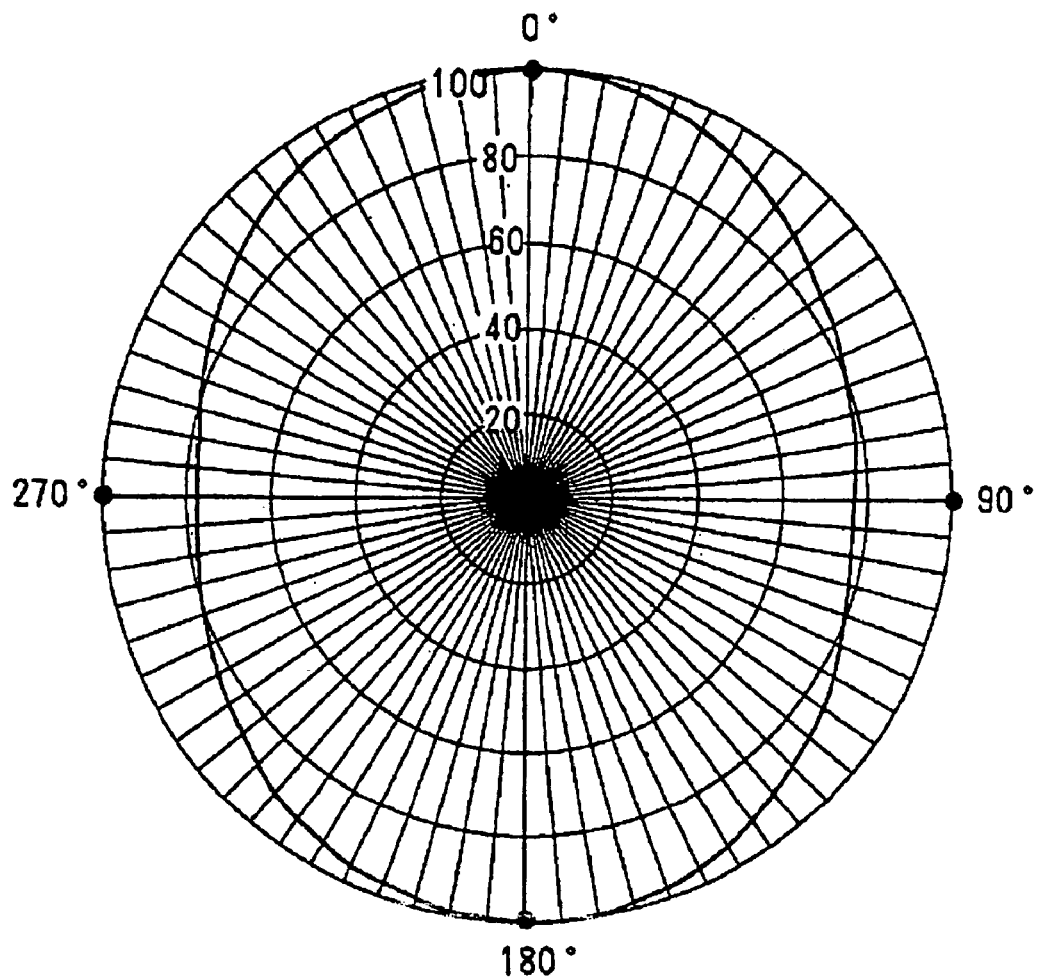
FIG. 6 is a first result obtained in a measurement according the method illustrated in FIG. 5.

As shown in FIG. 6, the photometer 28 gave the maximum value at 0 degree and 180 degrees respectively while the meter 28 gave the minimum value at 90 degrees and 270 degrees respectively. As a whole, the plotting curve is like an ellipse.

Light having a polarization state as above is inputted to the prism sheet 12. Here, properties of the prism sheet 12 is to be considered. As described above, since the sheet material 21 as a mother material of the prism sheet 12 undergoes a two-axle drawing process, states of molecule orientation induced in the process are different between right-half and left-half along a width-direction.

Consequently, it is expected that polarization characteristics of the prism sheet 12 varies depending on position at which the prism sheet is cut out from the sheet material 21. In other words, transmissivity is expected to be different depending on polarization components.

Figures 8, 9:
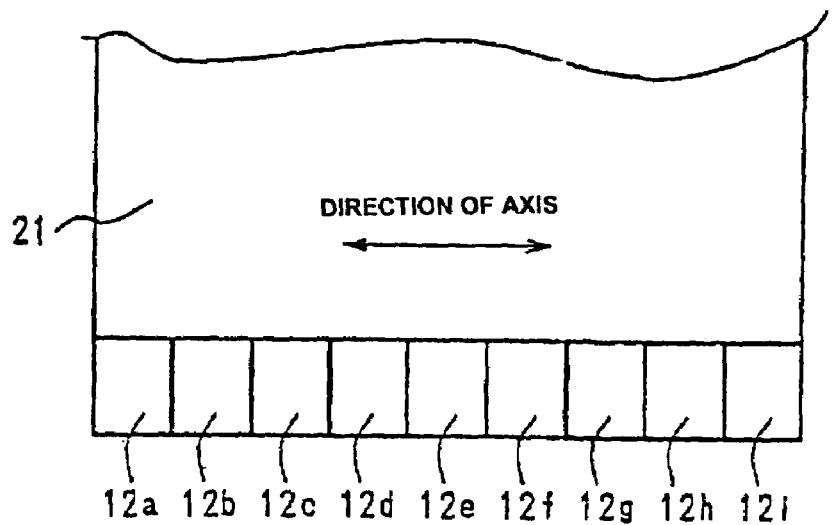
FIG. 8 is a diagram to illustrate cutting states of prism sheets.
FIG. 9 is a table to show screen brightness obtained in measurements where the prism sheets illustrated in FIG. 8 were arranged by turns in a liquid crystal display.

Under the above situation, the sheet material 21 was divided into nine sections 12a through 12i from an end toward the other end along the width-direction, as shown in FIG. 8, and prism sheets were prepared by cutting out from the sections, respectively. Each of the prepared prism sheet 12a through 12i was employed to provide a liquid crystal display 1, screen brightness of which was measured. The measurement was carried out without changing condition except exchanging of prism sheets.

It is noted that the transmission axis 16 of the polarization plate 14 comprised in the liquid crystal display panel 3 employed in the measurement is inclined 45 degrees toward the lower right in the illustration of FIGS. 13a, 13b with respect to an end edge 17 on the side of the fluorescent lamp 16. It is also noted that each prism sheet and a section from which the prism sheet was cut are referenced by the same symbol.

FIG. 9 gives a table showing results. During the measurement, each cell element in the liquid crystal cell 13 of the liquid crystal display panel 3 was kept in a transmission state. Brightness brought by the light, which was transmitted through the liquid crystal display panel 3, was plotted corresponding to each of the prism sheet 12a through 12i.

As illustrated in FIG. 9, if any of prism sheets 12a through 12c is employed, screen brightness on the liquid crystal display panel 3 was 205 (cd/m$^2$) or more. On the other hand, if any of prism sheets 12g through 12i is employed, screen brightness on the liquid crystal display panel 3 was about 190 (cd/m$^2$), falling doubtlessly. Display brightness obtained under employment of the prism sheet 12g was lower than that obtained under employment of the prism sheet 12a by about 12%. This gives the maximum difference.

Marks ○, Δ and X in the rightmost column in FIG. 9 express estimated grades, "95% or more of the maximum brightness (well-lighted)", "not less than 90% and less than 95% of the maximum brightness (intermediately-lighted)" and "less than 90% of the maximum brightness (less-lighted)", respectively.

These results teach that the prism sheet 12 causes difference in screen brightness of liquid crystal display 1. Considering this situation, polarization characteristics of the prism sheets 12a through 12c marked with ○ and those of the prism sheets 12f through 12h marked with X were measured for the sake of comparison.

Figure 7:
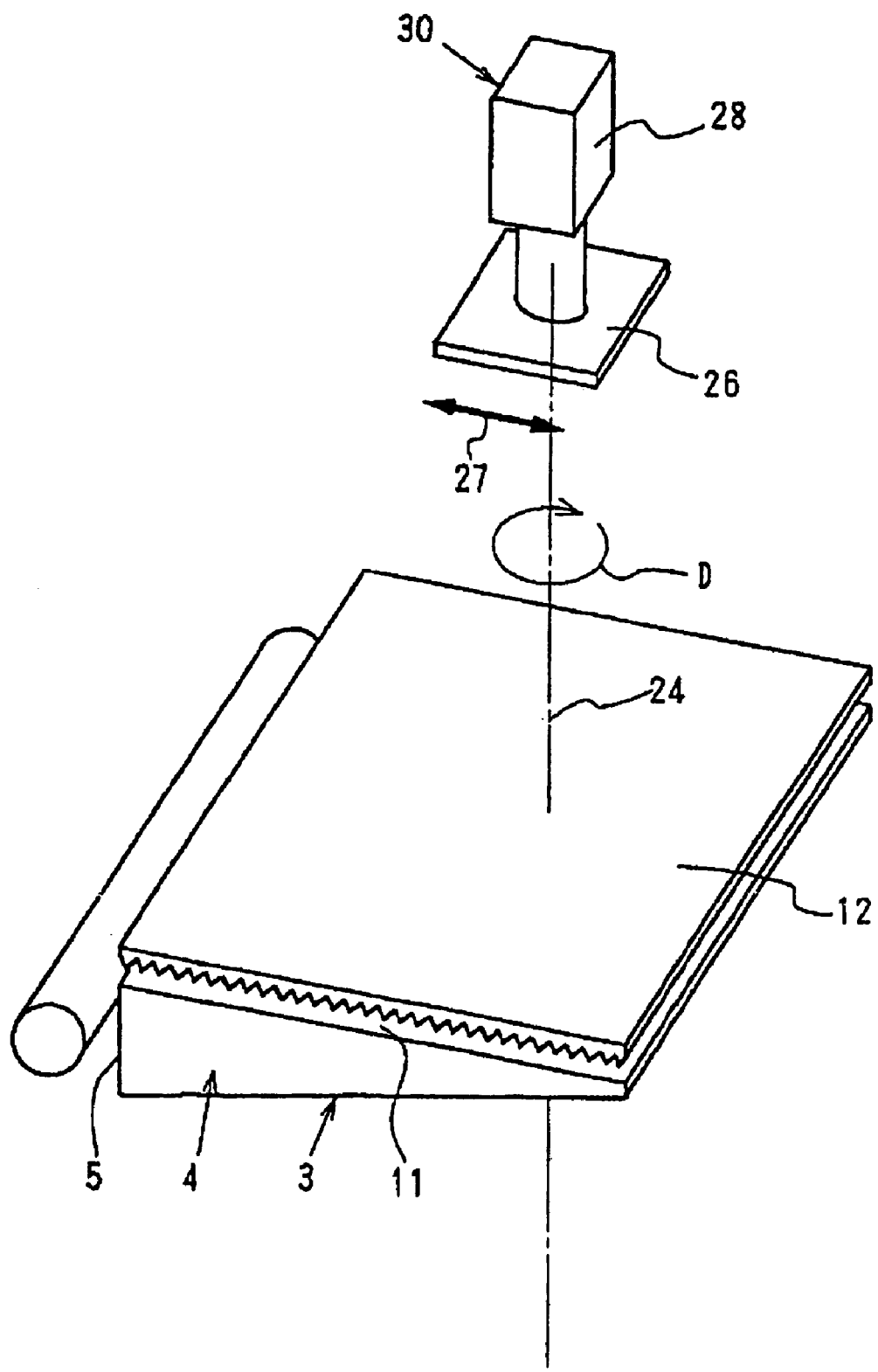
FIG. 7 is a diagram to illustrate a method for measuring polarization state of light after transmitting through a prism sheet.

This measurement was carried out under an arrangement as shown in FIG. 7. Individual prism sheet (i.e. one of the prism sheets 12a through 12c and 12f through 12h) was disposed on the emission face 11 of the light guide plate 4 one after another and, at every disposal, an output light emitted in a direction of a normal 24 was examined for polarization state. This measurement was carried out in a way like that shown in FIG. 5. In other words, the photo-intensity measuring device 30 was arranged so that the photometer 28 detected light which transmitted through the polarization plate 26 for measurement having the transmission axis 27.

Figure 10:
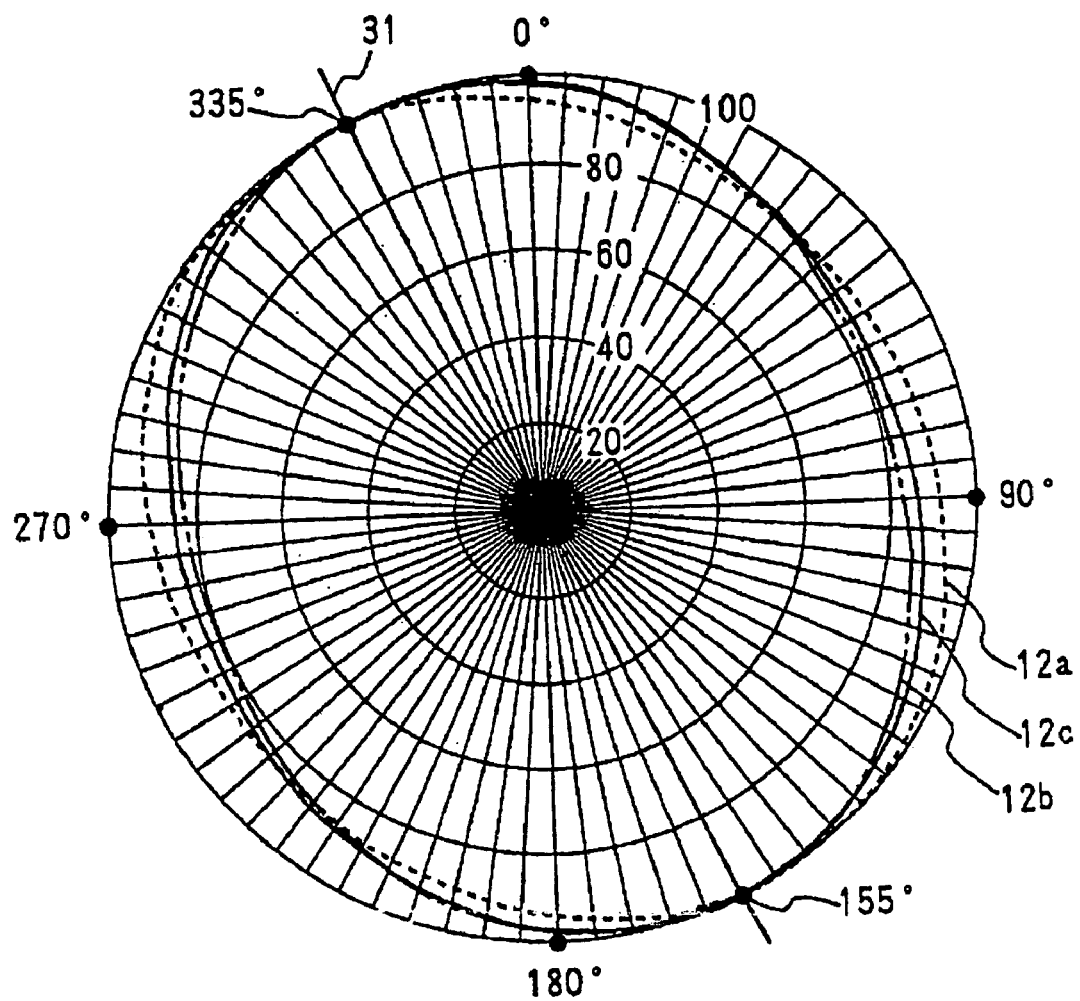
FIG. 10 is a graphic illustration to show polarization states of emissions after transmitting through prism sheets 12a to 12c shown in FIG. 8, respectively.
Figure 11:
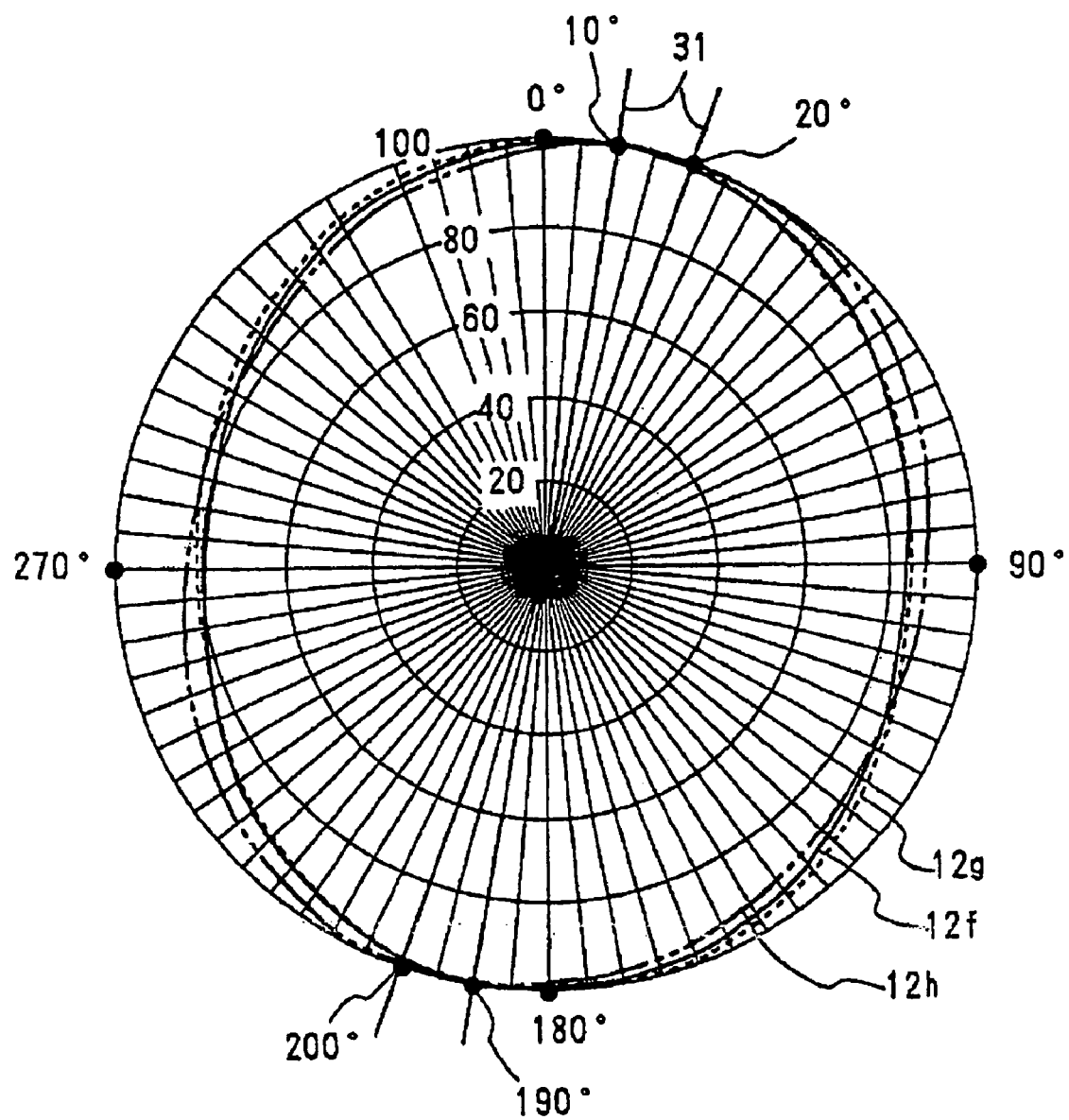
FIG. 11 is a graphic illustration to show polarization states of emissions after transmitting through prism sheets 12f to 12h shown in FIG. 8, respectively.

Intensity of light was measured at many rotation positions of the polarization plate 26 around the direction 24. FIG. 10 is a graphic illustration to show polarization states of emissions after transmitting through he prism sheets 12a to 12c, respectively. And FIG. 11 is a graphic illustration to show polarization states of emissions after transmitting through he prism sheets 12f to 12h, respectively.

In these graphs, an angular scale extending peripherally indicates orientational positions of the light transmission axis 27 (dual-arrow in FIG. 7) at the measurement. A radial scale indicates relative intensity of light detected by the photometer 28. The full scale is 100.

When the transmission axis 27 is orientated in accordance with the direction 25 perpendicular to the incidence face 5, it corresponds to 0 degree or 180 degrees. In the illustrated case, FIG. 7 shows a state of 0 degree. The polarization plate for measurement 26 was rotated clockwise (arrow D) from 0 degree position stepwise by 5 degrees, wherein a polarization component was measured at every rotation position.

Referring to a graph shown in FIG. 10 (○ mark:12a to 12c were employed), it shows plotting curves like ellipses having a longitudinal axis 31 which is formed by polarization components corresponding to about 335 and 155 degrees. This longitudinal axis 31 gives a maximum-intensity-direction of polarization of the emitted light.

Referring to a graph shown in FIG. 11 (X mark:12f to 12h were employed), it shows plotting curves like ellipses having a longitudinal axis 31 which is formed by a polarization component corresponding to an angle between about 10 and 20 degrees and another polarization component corresponding to another angle between about 190 and 200 degrees. This longitudinal axis 31 gives a maximum-intensity-direction of polarization of the emitted light.

In other words, FIG. 10 show cases giving a maximum-intensity-direction 31 located at an angular position which is deviated anticlockwise by about 25 degrees from a fiducial angular position of 0 degree-180 degrees. On the other hand, FIG. 11 show cases giving a maximum-intensity-direction 31 located at an angular position which is deviated clockwise by between about 102 and about 20 degrees from the fiducial angular position of 0 degree-180 degrees.

This teaches that the prism sheets 12a through 12h are, if any of them employed, cause the liquid crystal display 1 to provide variation in screen brightness depending on cutting position of the employed one.

Figure 12:
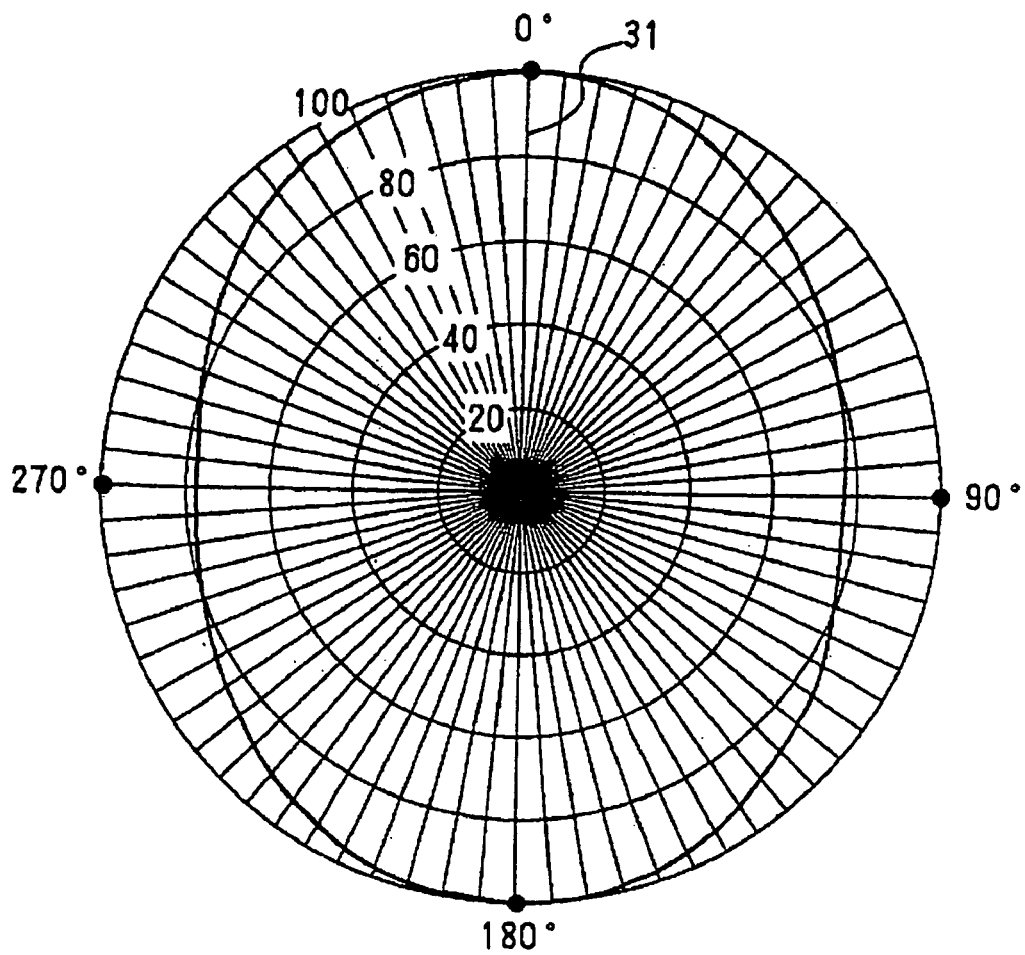
FIG. 12 is a graphic illustration to show a polarization state of emission after transmitting through an acrylic-resin prism sheet manufactured by means of compression molding.

Next, a prism sheet 12 manufactured by compression molding of acrylic resin, instead of the foredescribed manufacturing steps, was employed to be subject to measurement of polarization characteristics under the same condition. Results are shown in FIG. 12. Format of illustration is the same as that of FIG. 10 or 11. It is noted that nothing was changed as to configuration and size of prismatic grooves.

Results shown in FIG. 12 provides a plotting curve like an ellipse having a longitudinal axis 31 which is formed by polarization components corresponding to 0 and 180 degrees. This longitudinal axis 31 gives a maximum-intensity-direction of polarization of the emitted light. In other words, this maximum-intensity-direction 31 accords with the fiducial angular position. It is supposed that such accordance is due to absence of molecular orientation as was induced in the case of the PET sheet 21 to which two-axle drawing applied.

It is important that the above longitudinal axis 31 in FIG. 12 has a direction which corresponds to the maximum-intensity-direction 23 of emission from the light guide plate 4. In other words, polarization state at emitting from the light guide plate 4 is almost maintained until after transmission through the prism sheet 12.

That is, the prism sheet 12 manufactured by compression molding of acrylic resin does not cause the maximum-intensity-direction 31 of polarization of inputted light to be shifted rotationally from the fiducial angular position, if the input light is provided by emission from the light guide plate 4.

The above facts attest that rotation of maximum-intensity-direction of polarization, which occurred under employment of the prism sheets 12a through 12h, is due to none other than the PET sheet 21 to which two-axle drawing applied. Viewing from another standpoint, existence of a prismatic face is not the cause which brings the maximum-intensity-direction 31 a rotation shift.

Now, please remind that the transmission axis 16 of the polarization plate 14 of the liquid crystal display panel 3 employed in the foresaid screen brightness measurement (FIG. 9) is, as illustrated in FIG. 13a or FIG. 13b, inclined 45 degrees toward the lower right in the illustration with respect to an end edge 17 on the side of the fluorescent lamp 16.

Under this condition, the maximum-intensity-direction 31 shown in FIG. 10 is inclined to a side to which the transmission axis 16 of the polarization plate 14 is inclined. And besides, there is only a small difference in inclination, about 20 degrees, between the direction 31 and the transmission axis 16 which has an inclination angle equal to 45 degrees (FIG. 13a).

This teaches that employment of the prism sheets 12a through 12c causes the emitted light to contain an abundant-light-involving polarization component which meets the transmission axis 16 of the polarization plate 14 to transmit through the polarization plate 14.

To the contrary, under the same condition as above, the maximum-intensity-direction 31 shown in FIG. 11 is inclined to another side (i.e. inclined to the lower left) which is opposite to foresaid side to which the transmission axis 16 of the polarization plate 14 is inclined. Crossing angle with respect to the transmission axis 16 is remarkably large, falling in a range from 55 degrees to 65 degrees (FIG. 13b).

This teaches that employment of the prism sheets 12f through 12h causes the emitted light to contain a poor-light-involving polarization component which meets the transmission axis 16 of the polarization plate 14 to transmit through the polarization plate 14.

From the above outcome, difference in screen brightness shown in FIG. 9 can be accounted as follows.

Variation of screen brightness as shown in FIG. 9 was produced depending on deviations of maximum-intensity-direction 31 of emission after transmitting through the respective prism sheets 12a through 12h. In other words, the problem to which prior arts are subject is caused by the deviations of maximum-intensity-direction 31 of emission after transmitting through the respective prism sheets 12a through 12h.

Therefore, as a conclusion, the present embodiment employs any one of the prism sheets 12a to 12c as a prism sheet to be used in combination with a liquid crystal display panel 3 provided with a polarization plate 14 which is arranged so that the transmission direction is orientated as illustrated in FIG. 13a or 13b. In other words, none of the prism sheets 12d through 12h are not employed.

This enables the maximum-intensity-direction 31 of polarization involved by emission from the light guide plate 4 to be rotated toward the direction of the transmission axis 16 of the polarization plate 14, leading to an increased polarization component which is able to transmit through the polarization plate 14. As a result, the liquid crystal display 1 is able to provide an improved screen brightness.

Another point is that products (liquid crystal displays 1) get free from being of uneven screen brightness by means of excluding the prism sheets 12d through 12h intentionally.

The liquid crystal display 1 of the instant embodiment operates as follows.

The fluorescent lamp 6 emits illumination light (primary light), which is deflected by the light guide 4 to be converted into a flux having an enlarged cross section according to well-known processes. The flux is supplied to the liquid crystal display panel 3 via the prism sheet (light control sheet) 12.

The outputted illumination light transmits, after transmitting through the prism sheet 12 (any one of the prism sheets 12a to 12c), through the polarization plate 14 at a high transmissivity as explained above, being supplied to the liquid crystal display cell 13. As known well, the liquid crystal display cell 13 controls polarization state of the inputted light depending on position according to output signals of a drive circuit (not shown).

Then, output light of the liquid crystal display cell 13 transmits through the polarization plate (analyser) 15 depending on state of polarization. From the polarization plate (analyser) 15, light is emitted with an intensity controlled depending on position to provide an image.

(2) Other Embodiments (Modifications)

The above embodiment puts no limitation on the scope of the present invention. For instance, the following modifications are allowed.

(a) Attention should be paid first and foremost to that the above embodiment chooses the prism sheets 12a through 12c on condition that the polarization plate 14 is disposed with an orientation as shown in FIG. 13a or 13b.

Figure 17A:
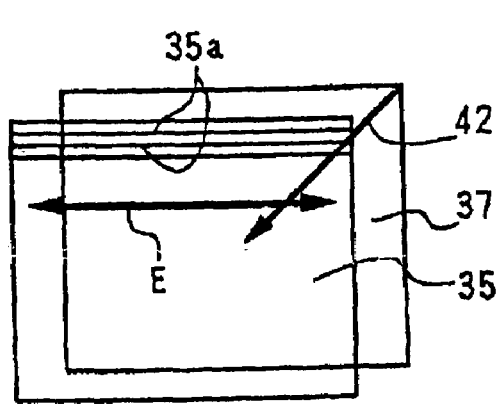
FIG. 17a is a diagram to illustrate a state of combination of a polarization plate and a prism sheet in a prior device; and, conventional liquid crystal display.
Figure 17B:
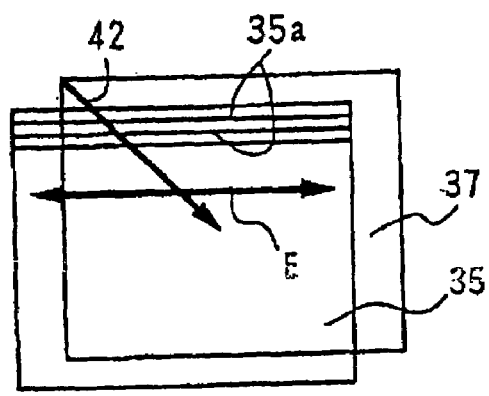
FIG. 17b is a diagram to illustrate another state of combination of a polarization plate and a prism sheet in a prior device.

That is, if an alternatively employed liquid crystal display panel 3 is provided with a polarization plate 14 orientated so that a transmission axis 16 is inclined 45 degrees toward the lower left in the illustration (FIG. 17a) with respect to an end edge 17 on the side of the fluorescent lamp 16, the prism sheets 12f through 12h are alternatively employed. In other words, the prism sheets 12a through 12g are not employed in the case.

This will be easily understood from the detailed description in the above embodiment. Note that the alternative case, in which the transmission axis 16 is inclined 45 degrees toward the lower left with respect to the end edge 17 on the side of the fluorescent lamp 16, renders the transmission axis 16 inclined to an opposite side as compared with the maximum-intensity-direction of polarization of light transmitted through any of the prism sheets 12a to 12c. Therefore, if the prism sheets 12a to 12c are employed, a reduced quantity of light will be able to transmit through the polarization plate 14.

To the contrary, if any of the prism sheets 12f to 12h are employed, the transmission axis 16 is inclined to the same side as compared with the maximum-intensity-direction of polarization of light transmitted through the employed prism sheet. As a result, an increased quantity of light will be able to transmit through the polarization plate 14.

Saying in relation to the estimation shown in FIG. 9 (marks ○, △, X), the prism sheets 12a to 12c get marks X instead of marks ○ while the prism sheets 12f to 12h get marks ○ instead of marks X.

After all, the present invention is featured by an essential requirement that the maximum-intensity-direction of polarization involved by light emitted from the light guide plate 4 is rotated toward the direction of light transmission axis of the polarization plate 14 which is disposed on the input-side of the liquid crystal display panel 3. Needless to say, both directions accord with each other in an ideal case.

Any optional concrete structure may be employed to cause emission from the light guide plate 4 to involve polarization. And, any particular limitation is not put on a concrete structure which is employed to cause the maximum-intensity-direction of polarization involved by emission from the light guide plate 4 to be rotated. Examples of employable modifications are described below.

(b) The above embodiment, prismatic grooves 19 are formed on the back face 8 of the light guide plate 4. However, this does not limit the present invention. For instance, prismatic grooves may be formed on the emission face 11 of the light guide plate 4. An alternatively employable light guide plate merely contains scattering material inside without being provided with prismatic grooves.

Figure 14:
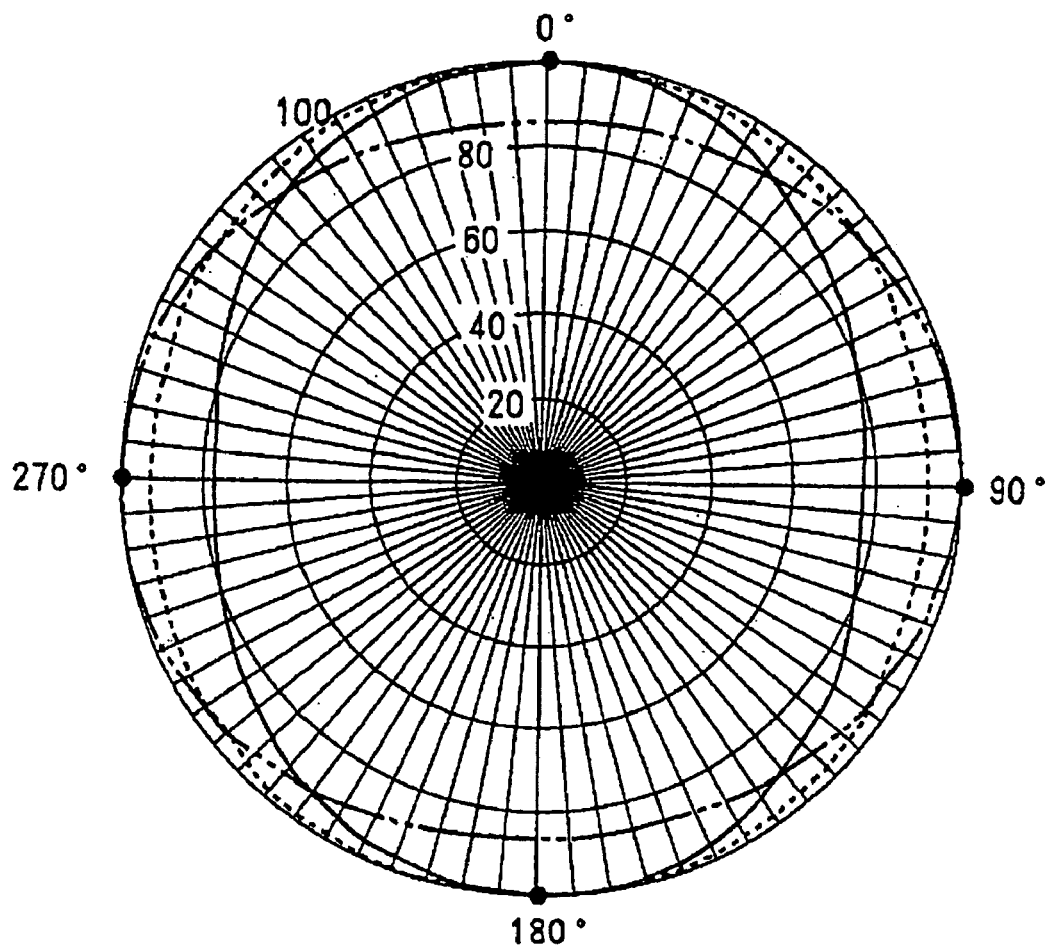
FIG. 14 is a graphic illustration to compare polarization states of emissions with each other, one of the emissions being outputted from a light guide plate having a back face provided with prismatic grooves, another being outputted from a light guide plate having an emission face provided with prismatic grooves, and the other being outputted from a light guide plate having back and emission faces provided with no prismatic groove.

FIG. 14 is a graphic to illustrate polarization state of emission from the light guide plate 4, being plotted under the measurement arrangement as shown in FIG. 5, wherein a solid-line-curve represents results obtained in a case where prismatic grooves 19 are formed on the back face 8 of the light guide plate 4 while a dot-line-curve represents results obtained in another case where prismatic grooves 19 are formed on the emission face 11 of the light guide plate 4. And, a double-dot-chain-line-curve represents results obtained in still another case where a light guide plate having no prismatic groove is employed.

As understood from FIG. 4, if prismatic grooves formed on the emission face 11, emission involves polarization like an ellipse having a longitudinal axis bridging 0 degree-180 degrees directions, as a similar plotting is obtained when prismatic grooves 19 are formed on the back face 8. Therefore, the prism sheets 12a to 12c may be applied in the same way as compared with the above embodiment, and almost the same advantageous effect as that of the above embodiment is obtained.

Another point to be noted is a fact a light guide plate 4 provided with no prismatic groove emits light which involves polarization like an ellipse having a longitudinal axis bridging 90 degrees-270 degrees directions, in contrast with one provided with prismatic grooves 19 on the back face 8. Accordingly, it is reasonable in this case to choose the prism sheets 12f to 12h which was estimated at X-mark in the foredescribed embodiment (FIG. 9).

This choice enables the maximum-intensity-direction 31 of emission from the light guide plate 4 to be rotated toward the transmission axis 16 of the polarization plate 14. As a result, advantageous effects are performed in almost the same way as compared with the foredescribed embodiment.

The above three kinds of light guide plates 4 are examples of styles of light guide plates employable in the present invention. It is noted that a style provided with prismatic grooves 19 on a back face 8 provides emission which involves a higher degree of polarization as shown in FIG. 14 as compared with the other styles. Thus this style is a particularly preferable one, since it is expected that rotation of maximum-intensity-direction of polarization involved by the emission causes quantity of light involving a polarization component capable of transmitting through the polarization plate 14 to be increased strikingly.

(c) In the above embodiment, the prism sheet 12 is cut out from a sheet member which is obtained through two-axle drawing. However, this puts no limitation on the present invention. For instance, a prismatic face may be formed on a PET sheet which is obtained through one-axle drawing. It is noted that a face on which a prismatic face is to be formed is chosen under consideration of an inclination direction of a light transmitting axis of a polarization plate 14.

(d) Inclination direction and angle of the transmitting axis 16 of the polarization plate 14 are not limited by the above embodiment, allowing various cases. Therefore, choice of the prism sheet 12 is performed under consideration of an inclination direction of a light transmitting axis 16 of a polarization plate 14 so that the chosen one enable the maximum-intensity-direction 31 of polarization involved by emission from the light guide plate 4 to be rotated toward the light transmitting axis 16 of the polarization plate 14.

(e) In the above embodiment, angle of polarization-rotation achieved by the prism sheet 12 can be brought still closer to an inclination angle of the transmission axis 16 of the polarization plate 14 by controlling factors such as drawing conditions during two-axle drawing of the PET sheet 20. In this case, the liquid crystal display 1 will provide a still improved screen brightness.

(f) In the above embodiment, at least one light control sheet provided with polarization-rotating ability may be interposed between the prism sheet 12 and the polarization plate 14 in order to bring the maximum-intensity-direction 31 of emission from the light guide plate 4 still more closer to the direction of the transmission axis 16 of the polarization plate 14. This enables also the liquid crystal display 1 to provide an improved screen brightness.

(g) The above embodiment makes the sheet member 21 shoulder function of rotating the maximum-intensity-direction of polarization involved by emission from the light guide plate 4. And further, the prismatic face 22 shoulders function of correcting a propagation direction of emission from the light guide plate 4. That is, both functions are shouldered by the prism sheet 12 solely. However, instead of this way, the functions may be shouldered by different members respectively.

Figure 15:
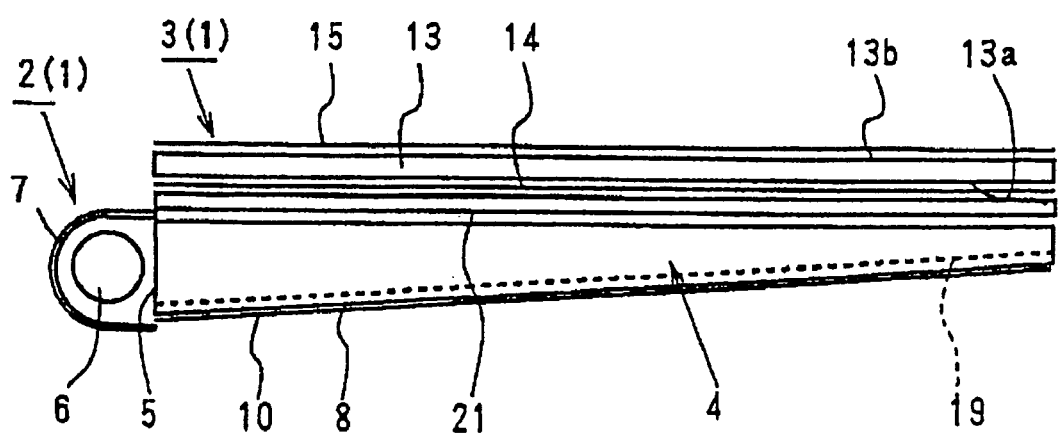
FIG. 15 is a cross section view of a liquid crystal display which employs a sheet member as a sole light control sheet.
Figure 16:
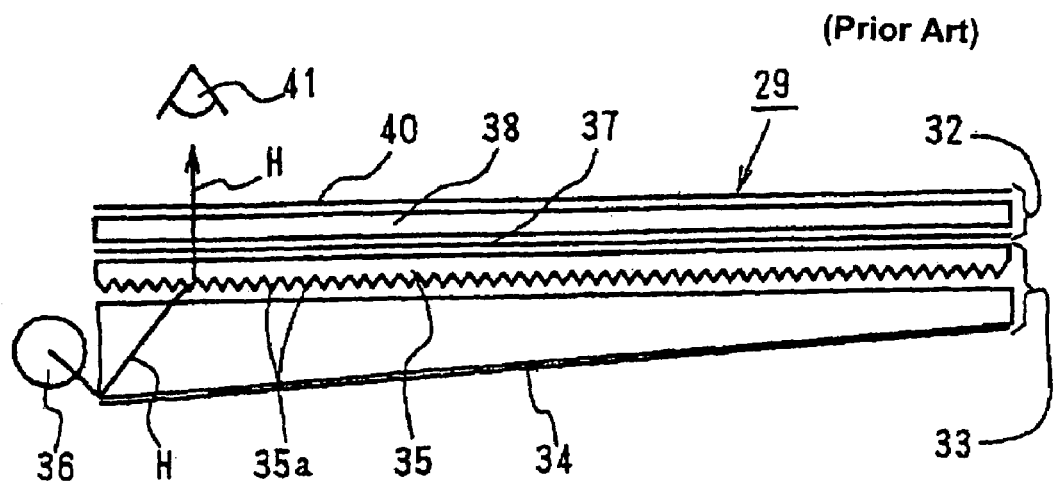
FIG. 16 is a diagram to illustrate a using state of a conventional liquid crystal display.

Further, for example, in cases where the propagation direction of emission does not need to be corrected, the foresaid sheet member 21 may be adopted solely as a light control sheet as shown in FIG. 15.

In such ways, the present invention requires a light control sheet to be at least provided with a polarization-rotatory power which rotate the maximum-intensity-direction of polarization involved by emission from the light guide plate 4.

(h) In the above embodiment, the employed light guide plate 4 has a wedge-like cross section. However, this does not limit the present invention. An alternative light guide plate having an emission face 11 and back face 8 extending in parallel with each other may be employed.

(i) The fluorescent lamp 6 is an example of employable primary light source and puts no limitation on the scope of the present invention. For instance, a light source provided with a linear array of light emitting diodes may be employed alternatively.

(j) In the above embodiment, the sheet member 21 to provide a mother material of the prism sheet 12 adopted as a light control sheet is made of PET. However, this does not limit the present invention. For instance, other materials such as polycarbonate or acrylic resin may be employed alternatively.

What is claimed is:

1. A liquid crystal display comprising:
   a liquid crystal display panel; and
   a surface light source device for inputting light to the liquid crystal display panel,
   said liquid crystal display panel being provided with at least a liquid crystal cell and a polarization plate arranged at an input side of the liquid crystal cell,
   said surface light source device being provided with at least a light guide plate emitting light having a polarization state, a primary light source to supply illumination light to said light guide plate and a light control sheet interposed between said light guide plate and said polarization plate,
   wherein said light control sheet is made of a particular portion of a resin material produced through a resin material drawing process and is provided with an ability acquired through the resin material drawing process and a cutting-out process for choosing the particular portion such that a maximum-intensity-direction of polarization of the light emitted from said light guide plate is rotated around a traveling direction of the light toward a direction of a light transmission axis of said polarization plate by transmitting through the light control sheet.

2. A liquid crystal display as recited in claim 1, wherein said light control sheet is a prism sheet disposed next to said polarization plate.

3. A surface light source device for inputting light to a liquid crystal display panel provided with at least a liquid crystal cell and a polarization plate arranged at an input side of the liquid crystal cell, comprising:
   at least a light guide plate emitting light having a polarization state;
   a primary light source to supply illumination light to the light guide plate; and
   a light control sheet interposed between said light guide plate and said polarization plate,
   wherein said light control sheet is made of a particular portion of a resin material produced through a resin material drawing process and is provided with an ability acquired through the resin material drawing process and a cutting-out process for choosing the particular portion such that a maximum-intensity-direction of polarization of the light emitted from said light guide plate is rotated around a traveling direction of the light toward a direction of a light transmission axis of said polarization plate by transmitting through the light control sheet.

4. A surface light source device as recited in claim 3, wherein said light control sheet is a prism sheet disposed next to said polarization plate.

5. A light control sheet arranged for inputting light to a liquid crystal display panel provided with a least a liquid crystal cell and a polarization plate which is arranged at an input side of the liquid crystal cell, the light control sheet being applied to a surface light source device provided with at least a light guide plate emitting light having a polarization state and a primary light source to supply illumination light to the light guide plate,
   wherein said light control sheet is made of a particular portion of a resin material produced through a resin material drawing process and is provided with an ability that acquired through the resin material drawing process and a cutting-out process for choosing the particular portion a maximum-intensity-direction of polarization of the light emitted from said light guide plate is rotated around a traveling direction of the light toward a direction of a light transmission axis of said polarization plate by transmitting through the light control sheet.

6. A light control sheet as recited in claim 5, wherein said light control sheet is a prism sheet disposed next to said polarization plate.

* * * * *

UNITED STATES PATENT AND TRADEMARK OFFICE
CERTIFICATE OF CORRECTION

| | |
|---|---|
| PATENT NO. | : 7,432,999 B2 |
| APPLICATION NO. | : 09/726329 |
| DATED | : October 7, 2008 |
| INVENTOR(S) | : Fuminori Hiraishi |

It is certified that error appears in the above-identified patent and that said Letters Patent is hereby corrected as shown below:

Column 1, Line 54, change congeniality to "congeniality".

Signed and Sealed this

Third Day of February, 2009

JOHN DOLL
*Acting Director of the United States Patent and Trademark Office*